Feb. 25, 1969  W. W. WOLFE ETAL  3,429,299
ANIMAL FEEDER
Filed March 15, 1967  Sheet 1 of 3
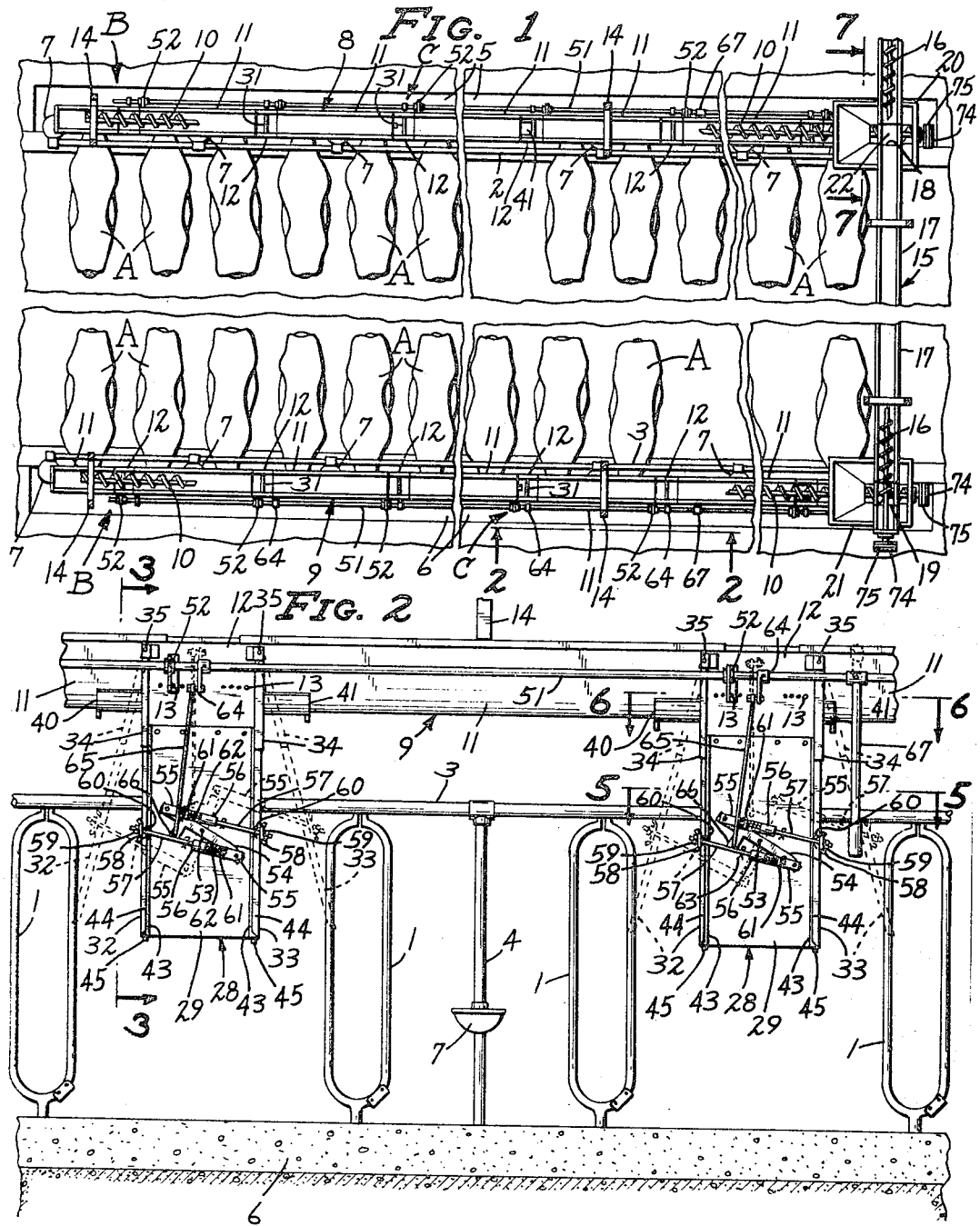
INVENTORS.
WALTER W. WOLFE
HALDOR J. HOFTEIG
BY
Merchant & Gould
ATTORNEYS

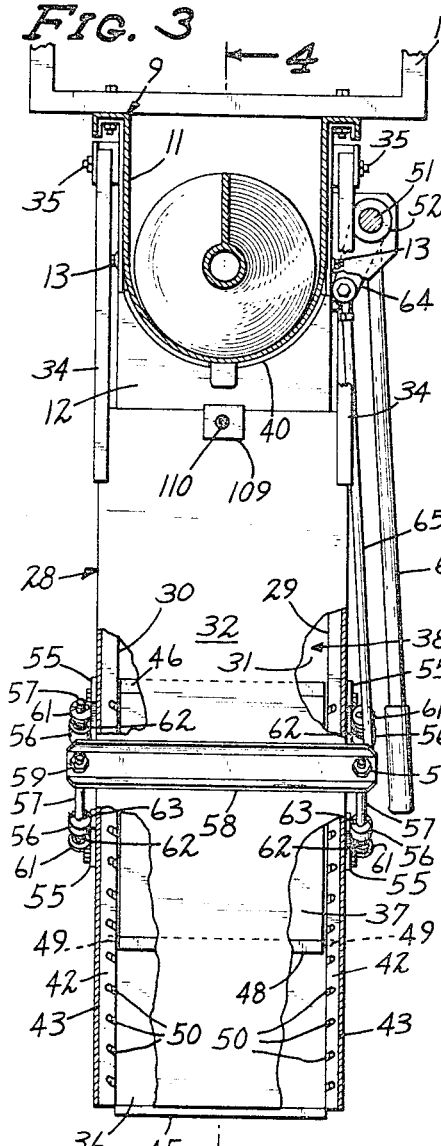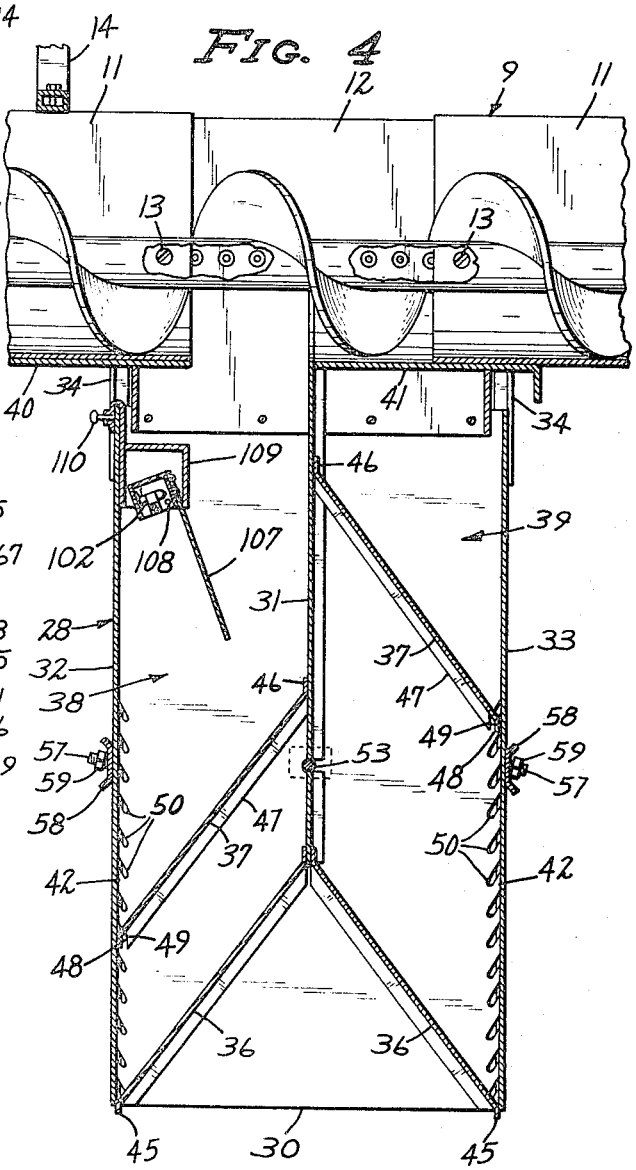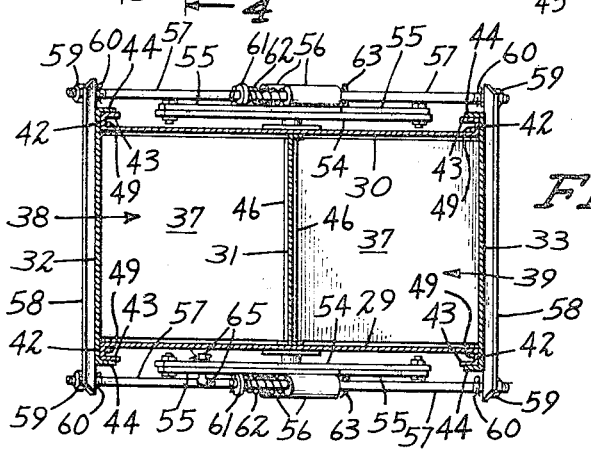

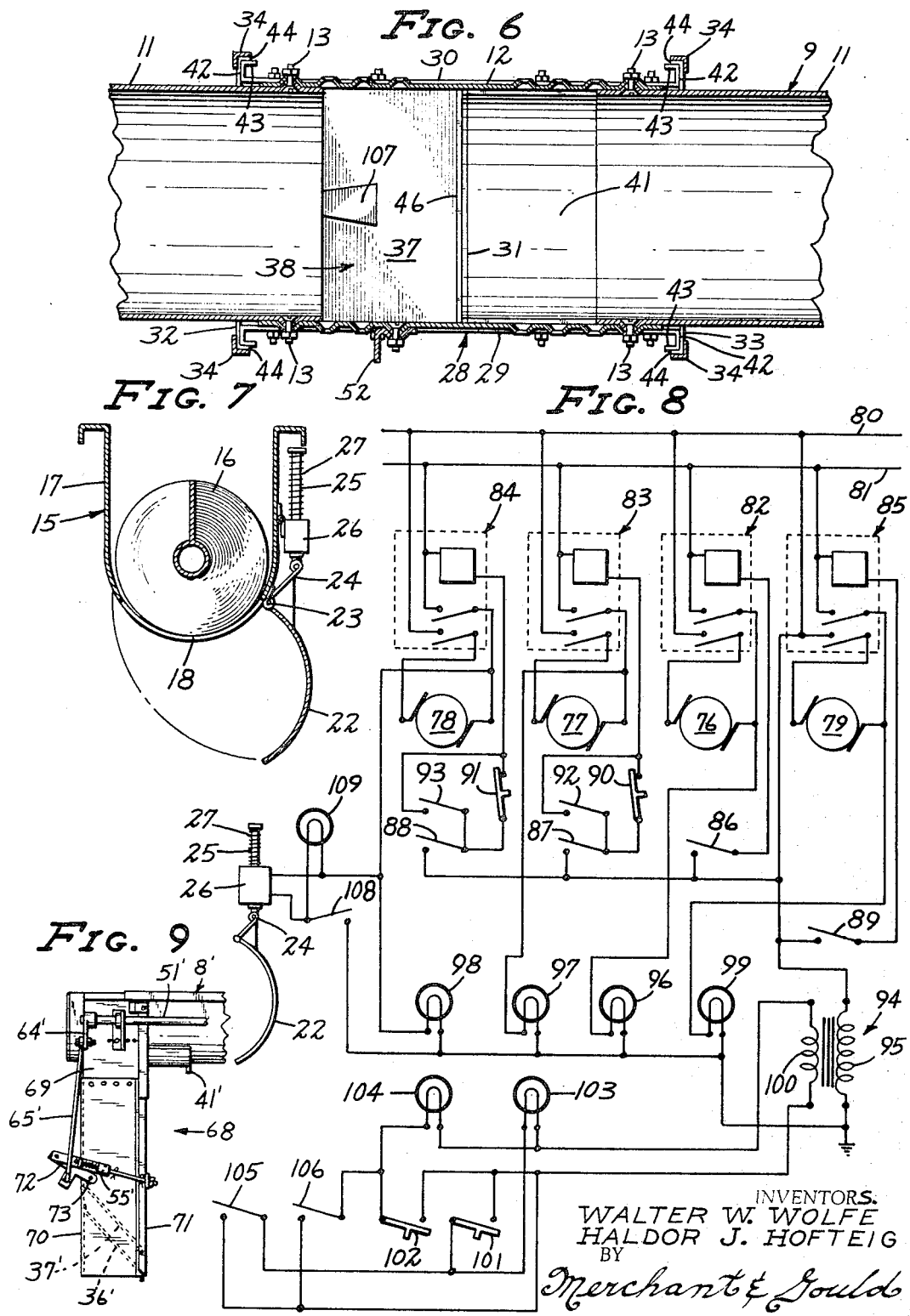

United States Patent Office 3,429,299
Patented Feb. 25, 1969

3,429,299
ANIMAL FEEDER
Walter W. Wolfe, Rte. 1, Box 504, and Haldor J. Hofteig, 2216 Noble Lane, both of Mound, Minn. 55364
Filed Mar. 15, 1967, Ser. No. 623,321
U.S. Cl. 119—56      9 Claims
Int. Cl. A01k 5/00; B65d 47/08

ABSTRACT OF THE DISCLOSURE

An animal feeder including at least one food collecting and dispensing hopper and a conveyor for delivery of food to the hopper, the hopper having a closure member and linkage including a pair of toggle members for imparting opening and closing movements to the closure member. The closure member and adjacent walls of the hopper are formed with cooperating edge portions which prevent opening of the closure member by an animal. The closure member is yieldingly held in its closed position by a spring operatively associated with the linkage.

Background of the invention

The present invention is in the nature of an improvement on feeding apparatus of the type disclosed in U.S. Letters Patent No. 3,125,991, issued to Frederick Van Dusen, and is designed for the simultaneous feeding of a plurality of animals. In prior art devices, wherein measured quantities of food are delivered to the animals confined by stanchions or in stalls, the animals often try to open the measuring or dispensing hoppers with their horns or teeth in an endeavor to obtain more food. This action often results in damage to the feeding gates or closure members and interferes with the proper operation thereof.

Summary of the invention

This invention includes hopper construction having a closure member and means for opening and closing the same, including a spring which yieldingly urges the closure member toward its closed position at the final closing movements of the member, whereby to prevent warping of, or damage to, the closure member in the event that food material becomes lodged between the closure member and adjacent wall portions of the hopper. The closure member and adjacent hopper wall portions are provided with overlapping flanges which effectively prevent an animal from engaging any portion of the closure member to open the same. The hopper includes a vertically adjustable bottom wall member and novel means, whereby the bottom wall member may be quickly and easily locked in selected positions to adjust the quantity of food made available to the feeding animal.

Description of the drawings

In the accompanying drawings, which illustrate the invention, and in which like reference characters indicate like parts throughout the several views:

FIG. 1 is a view in top plan of an animal feeder or feeding system produced in accordance with this invention, some parts being broken away;

FIG. 2 is an enlarged fragmentary view in front elevation, as seen from the line 2—2 of FIG. 1;

FIG. 3 is an enlarged view partly in side elevation and partly in transverse section, taken substantially on the line 3—3 of FIG. 2, some parts being broken away;

FIG. 4 is a transverse or axial section taken substantially on the line 4—4 of FIG. 3;

FIG. 5 is an enlarged horizontal section taken on the line 5—5 of FIG. 2;

FIG. 6 is an enlarged fragmentary section taken on the line 6—6 of FIG. 2, some parts being removed;

FIG. 7 is an enlarged transverse section taken on the line 7—7 of FIG. 1;

FIG. 8 is a wiring diagram; and

FIG. 9 is a view corresponding to a portion of FIG. 2 but showing a modified arrangement.

As shown primarily in FIGS. 1 and 2, the animal feeder of this invention is designed to accommodate a plurality of animals, such as cattle, indicated at A. In the feeder illustrated, the neck of each feeding animal extends through a conventional stanchion 1, the several stanchions being supported in two parallel rows by elongated rails 2 and 3 at the upper ends of supporting tubes or pipe 4 adjacent a pair of laterally spaced generally parallel feeding troughs 5 and 6 respectively. The tubes or pipes 4 are disposed between alternate ones of the stanchions 1 and support and feed drinking water to conventional fonts 7 in a well-known manner, not shown.

Animal food such as hay, grain or silage is delivered to the feeding troughs 5 and 6, from a suitable source of supply, not shown, by conveyor means including a pair of laterally spaced generally parallel horizontal conveyor sections 8 and 9 each overlying a respective one of the feeding troughs 5 and 6, and each including a longitudinally extending conveyor screw or auger 10 each of which is longitudinally disposed within a plurality of conveyor trough sections 11. The trough sections 11 in each of conveyor sections 8 and 9 are connected in longitudinally spaced axially aligned relationship by hopper supporting connector members 12, see particularly FIGS. 2–4 and 6, the connector members 12 being secured to adjacent end portions of the trough sections 11 by nut-equipped screws or the like 13. The conveyor sections 8 and 9 are supported in overlying spaced relationship to their respective feeding troughs 5 and 6 by supporting brackets 14 which may be assumed to be secured to the ceiling of the building structure, not shown, but in which the animals A are fed.

A cross conveyor 15 overlies and extends transversely of the conveyor sections 8 and 9 adjacent one end thereof, and comprises an elongated feed auger 16 extending longitudinally within a cross feed trough 17 having longitudinally spaced openings 18 and 19 through which animal feed is discharged into the conveyor sections 8 and 9 through funnel members 20 and 21 respectively, see FIG. 1. The discharge opening 18 is adapted to be closed by an arcuate gate 22 hinged to the cross conveyor trough 17, as indicated at 23 in FIG. 7, adjacent one side of the opening 18. A crank arm 24 is rigidly secured to the gate 22 for common swinging movements therewith, and is attached to one end of an armature 25 of a solenoid 26, the arrangement being such that, when the solenoid 26 is energized, the gate 22 will be moved by the armature 25 in a direction to close the discharge opening 18. A coil compression spring 27 is arranged to yieldingly urge the gate 22 to its open position shown in FIG. 7. Operation of the solenoid 26 is controlled by suitable means hereinafter to be described.

Bolted or otherwise rigidly secured to the hopper supporting connector members 12 and depending therefrom are food collecting hopper means 28 underlying the conveyor sections 8 and 9. Each hopper means 28 includes vertically disposed laterally spaced front and rear walls 29 and 30 respectively and laterally spaced side walls 31, 32 and 33, the side wall 31 being disposed intermediate the side walls 32 and 33 and welded or otherwise rigidly secured at its opposite side edge portions to the front walls 29 and 30. The side walls 32 and 33 comprise closure members for the hopper means 28 and, at their upper end portions are provided with generally vertically disposed hinge or hanger bars 34 that are pivotally secured at their upper ends to the connector members 12, as indicated at 35. The hopper means 28 each further includes bottom wall means comprising a pair of fixed bottom elements 36 that slope downwardly between the front and rear walls 29 and 30 from the wall or partition 31 toward the lower ends of the closure members 32 and 33, see FIG. 4, and movable bottom elements 37 that are disposed in upwardly spaced parallel relationship to their respective fixed bottom elements 36. The fixed bottom elements 36 are welded or otherwise rigidly secured at their upper ends to the side wall or partition 31 and at their opposite side edge portions to the front and rear walls 29 and 30.

The front and rear walls 29 and 30, side wall 31, closure member 32 and movable bottom element 37 cooperate to define a hopper chamber 38, the front and rear walls 29 and 30, side wall 31 and closure member 33 and movable bottom element 37 therebetween cooperating to define a hopper chamber 39, the hopper chambers 38 and 39 communicating with their overlying conveyor sections 8 and 9 between the spaced ends of adjacent conveyor trough sections 11. A pair of cross sectionally arcuate gate elements 40 and 41 are mounted for axial sliding movements between each adjacent pair of conveyor trough sections 11 and their respective connector members 12, to permit flow of animal food from the conveyor sections 8 and 9 to the hopper chambers 38 and 39 or to shut off delivery of food to the hopper chambers, as desired.

The front and rear walls 29 and 30, adjacent their respective closure members 32 and 33, are formed to provide laterally outwardly projecting wall portions 42 substantially normal to the walls 29 and 30, and backturned flanges 43 disposed in outwardly spaced parallel relationship to their respective front and rear walls 29 and 30, the wall portions 42 and flanges 43 extending longitudinally for substantially the vertical length of their respective front and rear walls. In their closed positions shown in FIGS. 4 and 5, and by full lines in FIG. 2, the closure members 32 and 33 abut their adjacent outwardly projecting wall portions 42, the closure members 32 and 33 being formed at their opposite side edges with longitudinally extending flanges 44 normal to the planes of their respective closure members 32 and 33 that closely embrace or overlap their adjacent backturned flanges 43. With reference to FIG. 5, it will be seen that the flanges 44 do not entirely cover their adjacent flanges 43. Hence, it is extremely difficult, if not impossible, for a feeding animal, such as a cow, to engage one of the flanges 44 with its horns or teeth to open one of the closure members 32 or 33. With reference to FIG. 4, it will be seen that the fixed bottom elements 36 are provided along their lower edges with depending flanges 45 which extend downwardly below the bottoms of the adjacent closure members 32 and 33, so that the animal cannot engage the bottom edges of the closure members 32 or 33 to open the same.

The movable bottom elements 37 are formed to provide upstanding flanges 46 that are adapted to rest against adjacent surfaces of the side wall or partition 31, and depending side flanges 47 that frictionally engage the adjacent inner surfaces of the front and rear walls 29 and 30. At their lower edge portions, the movable bottom elements 37 are formed with depending flanges or skirts 48 that abut their adjacent closure members 32 and 33 in a closed position. Adjacent the skirts 48, the movable bottom elements 37 are provided with laterally outwardly projecting pins 49 that are selectively receivable in a plurality of vertically spaced recesses or notches 50 formed in the laterally outwardly projecting wall portions 42 and adjacent portions of the front and rear walls 29 and 30, see FIGS. 3 and 4. With this arrangement, when the closure members 32 and 33 are open, the movable bottom elements 37 may be raised or lowered to reduce or enlarge the capacity of their respective hopper chambers 38 and 39, as desired. When it is desired to move a bottom element 37, it is only necessary to raise the inner edge portion or flange 46 away from engagement with the partition 31, move the lower edge upwardly and outwardly to disengage the pins 49 from their engaged notches 50, raise or lower the bottom element 37 to the desired height, cause the pins 49 to be received in the desired pair of notches and pivotally move the bottom element 37 inwardly until the flange 46 comes to rest against the adjacent surface of the partition wall 31.

Means for simultaneously opening and closing all of the closure members 32 and 33 associated with a given one of the conveyor sections 8 and 9 comprises an elongated horizontal shaft 51 journalled in spaced bearings 52 mounted on the several trough supporting connector members 12, and cooperating parts now to be described. A transverse shaft 53 is journalled adjacent its opposite ends in the front and rear walls 29 and 30 of each hopper means 28 in the plane of the partition wall 31, the partition wall 31 being cut away to permit passage of the shaft 53, see FIG. 4. The opposite ends of the shaft 53 are rigidly secured to the longitudinally central portion of a pair of levers 54 each disposed laterally outwardly of a different one of the front and rear walls 29 and 30. The opposite ends of the levers 54 are connected to respective ones of the closure members 32 and 33 by linkage including rigid arms 55 pivotally secured to the opposite ends of the lever 54 and having longitudinally extending tubular portions 56 through which axially slidably extend rigid links or rods 57. As shown in FIG. 2, the outer ends of the rods 57 are loosely mounted in adjacent ends of rigid bars 58 that are welded or otherwise secured to the closure members 32 and 33, and are held against axial movement relative to the bars 58 by nuts 59 and cotter pins 60 on the rods or links 57. The inner ends of the rods or links 57 are provided with washers or the like 61 between which and the adjacent ends of the tubular portions 56 are interposed coil compression springs 62 which yieldingly urge the rods 57 in one direction of axial movement relative to the arms 55. Cotter pins or the like 63 in the rods 57 limit spring imparted movement of the rods 57 in one direction relative to their respective arms 55. Each lever 54 is operatively connected to its adjacent shaft 51 by a pair of cooperating toggle members 64 and 65, the former being in the nature of a crank rigidly secured to the shaft 51, and the latter being in the nature of a rigid link pivotally connected at one end to the radially outer end of the toggle member 64 and at its other end to an end portion 66 of the lever 54. Each shaft 51 is rotated in opposite directions to open and close the closure members 32 and 33 associated therewith by an operating lever 67 rigidly secured to its respective shaft 51, see FIGS. 1–3. At initial opening and final closing movements of the closure members 32 and 33, the toggle members 64 and 65 move through a dead center relationship, the springs 62 being in a compressed state when the closure members 32 and 33 are closed to yieldingly urge the closure members 32 and 33 in a closing direction. When the levers 67 are moved in a direction to open the closure members 32 and 33, the tubular portions 56 move into engagement with the cotter pins 63 to positively open the closure members.

The form of hopper means illustrated in FIG. 9 is used in cooperation with a given number of hopper means 28 in a conveyor section adapted to feed an odd number of animals. Preferably, the hopper means of FIG. 9, indicated in its entirety by the reference numeral 68, is disposed at one end of the other of a conveyor section 8' and is substantially identical to one-half of one of the hopper means 28. The hopper means 68 is supported from the conveyor 8' by a hopper supporting member 69 and has a pair of opposed side walls 70 and 71 substantially identical to the side wall or partition 31 and one of the closure member 32 and 33 respectively. The closure member 71 is operatively connected to the operating shaft 51' by toggle members 64' and 65', the latter of which is pivotally connected to a lever 72 pivotally connected to the hopper means 68, as indicated at 73. The lever 72 is pivotally connected at its other end to a rigid arm 55' that is connected to the closure member 71. Like the hopper means 28, the hopper means 68 is provided with a gate element 41'. It will be noted that the above-mentioned parts designated with reference numerals having prime marks added are identical to corresponding parts carrying the same reference numerals described in connection with FIGS. 1–7. Further, the hopper means 68 includes a fixed bottom element 36' and a vertically adjustable bottom element 37', as shown by dotted lines in FIG. 9. Although not shown, it may be assumed that a second lever 72 is mounted on the opposite side of the hopper means 68 and provided with a second rigid arm 55', both of the arms 55' being rigidly secured to opposite ends of the shaft 73.

The conveyor augers 10 and 16 are driven by suitable connections, such as pulleys 74 and cooperating endless drive belts or the like 75 which may be assumed to be operatively connected to drive motors 76, 77 and 78, shown diagrammatically in FIG. 8. For the purpose of the present example, the motor 78 is connected to the conveyor auger 10 of the conveyor section 8, the motor 77 is operatively connected to the conveyor auger 10 of the conveyor section 9, and the motor 78 is operatively connected to the conveyor auger 16 of the cross conveyor 15. A fourth motor 79 may be assumed to be operatively connected to a silo unloader mechanism, not shown, for delivering animal feed material to the cross conveyor 15. The motors 75–79 are energized from a power line comprising power conductors 80 and 81, through separate circuits including motor control relays 82, 83, 84 and 85 respectively, and manually operated control switches 86, 87, 88 and 89 respectively. The control circuits for the motors 77 and 78 also include limit switches 90 and 91 respectively for automatically deenergizing their respective motors 77 and 78 when a predetermined amount of animal food is received in the hopper chamber 38 or 39 most remote from the cross conveyor 15. If it is desired to operate either of the conveyor motors 77 or 78 for the conveyor sections 8 and 9 respectively, after either of the limit switches 90 and 91 have opened, we provide shunt circuits for the switches 90 and 91 including manually operated switches 92 and 93 respectively.

Preferably, the circuits for the several motors 76–79 have an E.M.F. of approximately 220 volts. We provide signal circuits for the several drive motors including a transformer 94, the primary coil 95 of which has its opposite ends connected to the power conductor 80 and to ground, whereby one-half of the potential of the power conductors 80 and 81, or 110 volts, flows through the primary coil 95. A plurality of signal lamps 96, 97, 98 and 99 are connected to the grounded side of the transformer primary winding 95 and to the motor circuits for the motors 76, 77, 78 and 79 respectively, and are energized to indicate that their respective motors are operating. The secondary winding 100 of the transformer 94 provides a source of low voltage for a pair of signal switches 101 and 102 included in secondary circuits in series with a pair of signal lamps 103 and 104 respectively. Shunt circuits including test switches 105 and 106 and the signal lamps 103 and 104 respectively are utilized to test the operativeness of the signal lamps 103 and 104 when the signal switches 101 and 102 are open.

The signal switches 101 and 102, like the limit switches 90 and 91 are each mounted in a given hopper chamber associated with one of the conveyor sections 8 and 9, the signal switches and limit switches being substantially identical and mounted in their respective hopper chambers in the same manner. The signal switch 102 is shown in FIG. 4, the same being in the nature of a conventional mercury switch mounted in a switch actuator 107 that is pivotally mounted, as indicated at 108 in a bracket 109 in the upper portion of the hopper chamber 38. The bracket 109 is removably held in place by a thumb screw or the like 110. When a predetermined amount of food has been delivered to the hopper chamber 38, the weight thereof against the switch actuator 107 will swing the same in a direction to close the switch 102 and energize its corresponding signal lamp 104. Preferably, the limit switches 90 and 91 are disposed in the last hopper chambers associated with their respective conveyor sections 8 and 9, as indicated at B in FIG. 1. The signal switches 101 and 102 are disposed within hopper chambers associated with their respective conveyor sections 8 and 9 longitudinally spaced from the limit switches, as indicated at C in FIG. 1. As further shown in FIG. 8, the gate operating solenoid 26 is interposed in the transformer primary circuit and includes a switch 108 and a signal lamp 109. Preferably, the several motor control switches 86–89, over-ride switches 92 and 93, signal test switches 105 and 106, solenoid switch 108, and signal lamps 96–99, 103, 104 and 109 are mounted on a suitable control panel, not shown, and located at a convenient point in the feeder building.

In operation, assuming that the several hopper chambers are empty, the operator momentarily closes the test switches 105 and 106, to test the signal lamps 103 and 104. With the several hopper chambers empty, the limit switches 90 and 91 are closed and signal switches 101 and 102 are open. With the solenoid operating switch 108 open, the operator closes the several motor control switches 86–89 to initiate feeding operation of the silo unloader motor 79 and conveyor motors 76, 77 and 78, whereupon the silage or other feed material will be conveyed along the cross conveyor 15 from whence the same will drop through the opening 18 through the hopper 20 onto the conveyor section 8, from thence dropping by gravity into successive ones of the hopper chambers until the signal switch 101 at C, associated with the conveyor section 8, closes, causing the signal lamp 103 to be energized. Upon energization of the signal lamp 103, the operator manually closes the switch 108 to energize the solenoid 26 and close the gate 22, whereupon the food being delivered by the cross conveyor 15 will be carried to the opening 19 thereof and delivered to the conveyor section 9 through the hopper 21. The conveyor auger 10 of the conveyor section 8 will continue to operate until the limit switch 90 at B, associated with the conveyor section 8, opens thus automatically deenergizing the feed motor 77. The spacing of the switches 101 and 90 as indicated at B and C, associated with the conveyor section 8, is such that when the limit switch 90 is opened, the conveyor section 8 will be emptied of animal food.

During filling of the hopper means 28 associated with the conveyor section 9, the signal switch 102, located at C in conveyor section 9, closes to energize the signal lamp 104. Upon energization of the lamp 104, the operator opens the switch 89 to deenergize the silo unloader. The silage or other food remaining in the cross conveyor 15 and conveyor section 9 continues to be delivered to the hopper means associated therewith until the last hopper chamber is filled, at which time the limit switch 91 at B associated with conveyor section 9 will open to deenergize the conveyor motor 78. The operator then opens the switches 86, 87, 88 and 108 and moves the levers 67 in directions to open the closure members 32 and 33 whereupon the food in the several hopper chambers falls by gravity to the feed troughs 5 and 6.

In the event that the conveyor sections 8 and 9 are not entirely cleared of food when their respective limit switches 90 and 91 are opened, the operator can reenergize one or both of the conveyor operating motors 77 or 78 by manually closing the respective over-ride switch 92 or 93 until the conveyor trough sections 11 are completely empty of food. Thus, no food is left standing in the several conveyor sections between feedings.

As above indicated, when the several hopper closure members 32 and 33 are closed, either before or after discharge of animal food from their respective hopper chambers, the close fit of the closure members over their adjacent hopper walls effectively prevents feeding animals from engaging the closure members in a manner to force the same open.

It will be appreciated that the signal switches 101 and 102 can be easily mounted in any desired hopper means 28, so as to signal the operator to close the gate 22 or to shut off the source of food by opening the switch 89 to deenergize the motor 79 at such time that the cross conveyor 15 and conveyor sections 8 and 9 will be entirely empty of food just as the limit switches 90 and 91 are caused to open by the predetermined accumulation of food in their respective hopper chambers located at B in FIG. 1. By completely emptying the several conveyors, the problem of maintaining the same in a clean and efficiently operating condition is greatly simplified. Further, by opening or closing given ones of the gate elements 41 prior to delivery of food to their respective hopper chambers, delivery of food to the feed troughs 5 and 6 adjacent unoccupied stanchions 1, with consequent waste of food is prevented.

While we have shown and described a commercial embodiment of my animal feeder, it will be understood that the same is capable of modification, and that modification may be made without departure from the spirit and scope of the invention.

What is claimed is:

1. An animal feeder comprising:
   (a) a food conveyor,
   (b) food collecting hopper means underlying said conveyor for reception of food therefrom, said hopper means including:
      (1) spaced front and rear walls and a pair of side walls, one of said side walls being movable generally toward and away from the other thereof and providing a closure member,
      (2) and bottom wall means sloping downwardly between said front and rear walls from said other side wall toward said closure member and cooperating with said front, rear and side walls to define a hopper chamber,
   (c) hinge means mounting said closure member for swinging movements between open and closed positions relative to said front and rear walls and bottom wall means,
   (d) and closure member operating means for moving said closure member between said open and closed positions and including:
      (1) a pair of toggle members movable to opposite sides of dead center relationship at initial opening and final closing movements of said closure member,
      (2) spring means urging said toggle members in directions away from said dead center relationship and yieldingly holding said closure member in its closed position,
      (3) and means for imparting closure member opening and closing movements to said toggle member.

2. The animal feeder defined in claim 1 in which said closure member operating means further includes a lever pivotally mounted intermediate its ends on one of said front and rear walls and having one end portion pivotally connected to one of said toggle members, an arm pivotally connected to the other end of said lever, and a rigid link longitudinally slidably mounted on said arm and connected to said closure member, said spring means being mounted on said arm and link and yieldingly urging said link in one direction of said sliding movement thereof relative to said arm.

3. The animal feeder defined in claim 1 in which said front and rear walls extend transversely beyond said other side wall, characterized by a second closure member and second bottom wall means cooperating with said front and rear walls and other side wall to define a second hopper chamber, and means mounting said second closure member for movements toward and away from closing engagement with said front and rear walls, said second bottom wall means sloping downwardly between said front and rear walls from said other side wall toward said second closure member.

4. The animal feeder defined in claim 3 in which said closure operating means includes a lever operatively connected to one of said toggle members and to each of said closure members for opening and closing said closure member simultaneously, said spring means comprising a pair of springs each associated with said lever and with a different one of said closure members.

5. The animal feeder defined in claim 1 in which said front and rear wall members are formed at their edges adjacent said closure member to provide laterally outwardly projecting wall portions substantially normal to their respective front and rear walls, and back-turned flanges in outwardly spaced generally parallel relation to their respective front and rear walls, said wall portions and back-turned flanges extending longitudinally for the greater part of the length of said front and rear walls, said closure member having opposite side edge portions providing longitudinally extending flanges generally normal to the plane of said closure member and each closely overlapping an adjacent one of said back-turned flanges when said closure member is moved to its closed position in engagement with said outwardly projecting wall portions.

6. The animal feeder defined in claim 5 in which said bottom wall means comprises a vertically adjustable bottom wall section having an inner edge resting against said other side wall and sloping downwardly toward said closure member, said bottom wall section having an outer edge portion disposed adjacent said closure member and a pair of axially aligned supporting pins projecting laterally outwardly from opposite side edges thereof adjacent said outer edge, said outwardly projecting wall portions and adjacent portions of said front and rear walls having aligned vertically spaced notches for selective reception of said supporting pins, whereby said adjustable bottom wall section is supported at different selected elevations in said hopper chamber.

7. The animal feeder defined in claim 4 in which said food collecting hopper means comprises a plurality of hoppers disposed in spaced relationship longitudinally of said conveyor, said means for imparting closure member opening and closing movements to said toggle members comprising:
   (a) an elongated shaft extending longitudinally of said conveyor and journalled for rocking movements on its own axis, said shaft being rigidly secured to one of the toggle members association with each of said hoppers,
   (b) and an operating arm rigidly secured to said shaft for imparting rocking movements thereto, whereby to open and close the closure members of all of said hoppers simultaneously.

8. The animal feeder defined in claim 7 in which said food conveyor comprises a pair of laterally spaced conveyor sections each provided with a plurality of longitudinally spaced hoppers, characterized by:
   (a) a cross conveyor extending transversely of said pair of conveyor sections in overlying spaced relation to one end of each of said pair for delivery of food to each of said conveyor sections,
   (b) a gate on said cross conveyor controlling feed of material therefrom to one of said conveyor sections,
   (c) and means for opening and closing said gate.

9. The animal feeder defined in claim 8 characterized by:
  (a) operating means including a plurality of drive motors each associated with a different one of said conveyor sections and said cross conveyor,
  (b) and circuit means for said motors and including a pair of limit switches each associated with a hopper underlying a different one of said conveyor sections and operative responsive to feeding of a predetermined quantity of food to its respective hopper to deenergize its respective conveyor drive motor.

References Cited

UNITED STATES PATENTS

| 2,636,648 | 4/1953 | Richardson | 222—503 |
| 2,962,191 | 11/1960 | Moore. | |
| 3,125,991 | 3/1964 | Van Dusen | 119—56 |
| 3,180,318 | 4/1965 | Fisher | 119—56 |

HUGH R. CHAMBLEE, *Primary Examiner.*

U.S. Cl. X.R.

222—503